United States Patent [19]

Armstrong et al.

[11] 4,443,151
[45] Apr. 17, 1984

[54] AUTOMATIC SOIL PLUG LOADER AND FEEDER

[75] Inventors: Errol C. Armstrong; William A. Hanacek, both of Salinas; Thomas A. Spinetti, Watsonville, all of Calif.

[73] Assignee: Bud Antle, Inc., Salinas, Calif.

[21] Appl. No.: 167,289

[22] Filed: Jul. 9, 1980

[51] Int. Cl.³ ............................................. A01C 11/00
[52] U.S. Cl. ........................................ 414/404; 111/3; 414/417
[58] Field of Search ..................... 414/404, 417; 111/3

[56] References Cited

U.S. PATENT DOCUMENTS 3,722,719 3/1973 Frank ................................. 414/417
4,156,395 5/1979 Edwards et al. ................ 414/417 X Primary Examiner—Robert G. Sheridan
Attorney, Agent, or Firm—Townsend and Townsend

[57] ABSTRACT

A machine for automatically removing soil plugs from the densely packed configuration of their growing tray and presenting them serially in a reliable and precisely positioned manner to appropriate plug takeup portions of an automated plug handling system. Broadly, the plug loader and feeder according to the present invention comprises a reciprocating plug ejection mechanism operable to remove a complete row of plugs from the tray, a tray indexing mechanism for incrementally moving the tray, one row at a time, past the plug ejection mechanism, and a carousel feeder which acts first as a receiving station and then as a plug presenting system. The machine further comprises a synchronous drive mechanism for taking motion from any appropriate input drive and generating the timed motions of the above-mentioned components over each machine cycle. A machine cycle is characterized by the ejection of one row of plugs from the tray, the typically downward movement of the tray by one row, and the movement of the carousel by a distance equal to the length of a row.

16 Claims, 25 Drawing Figures

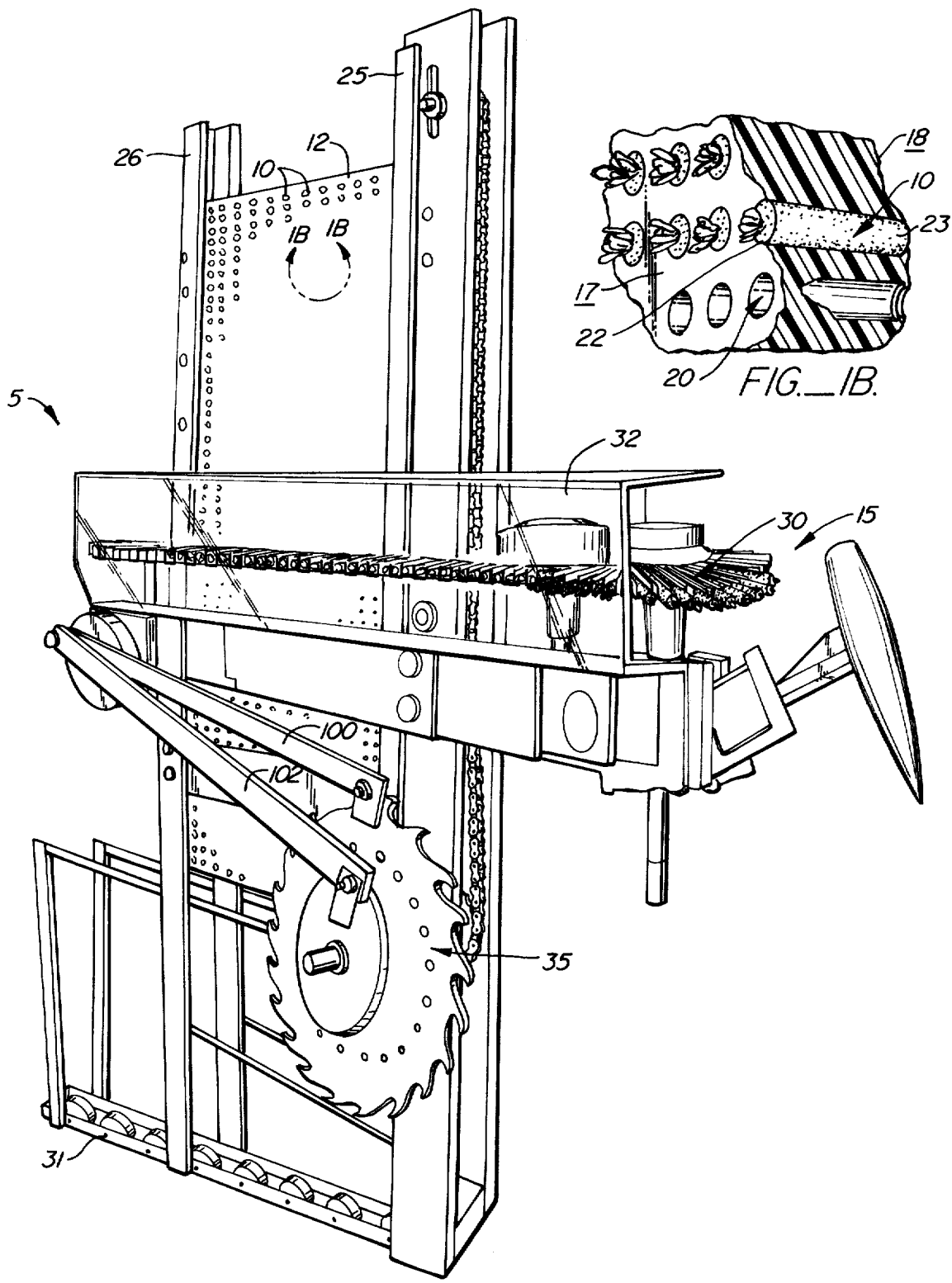
FIG._1A.
FIG._1B.

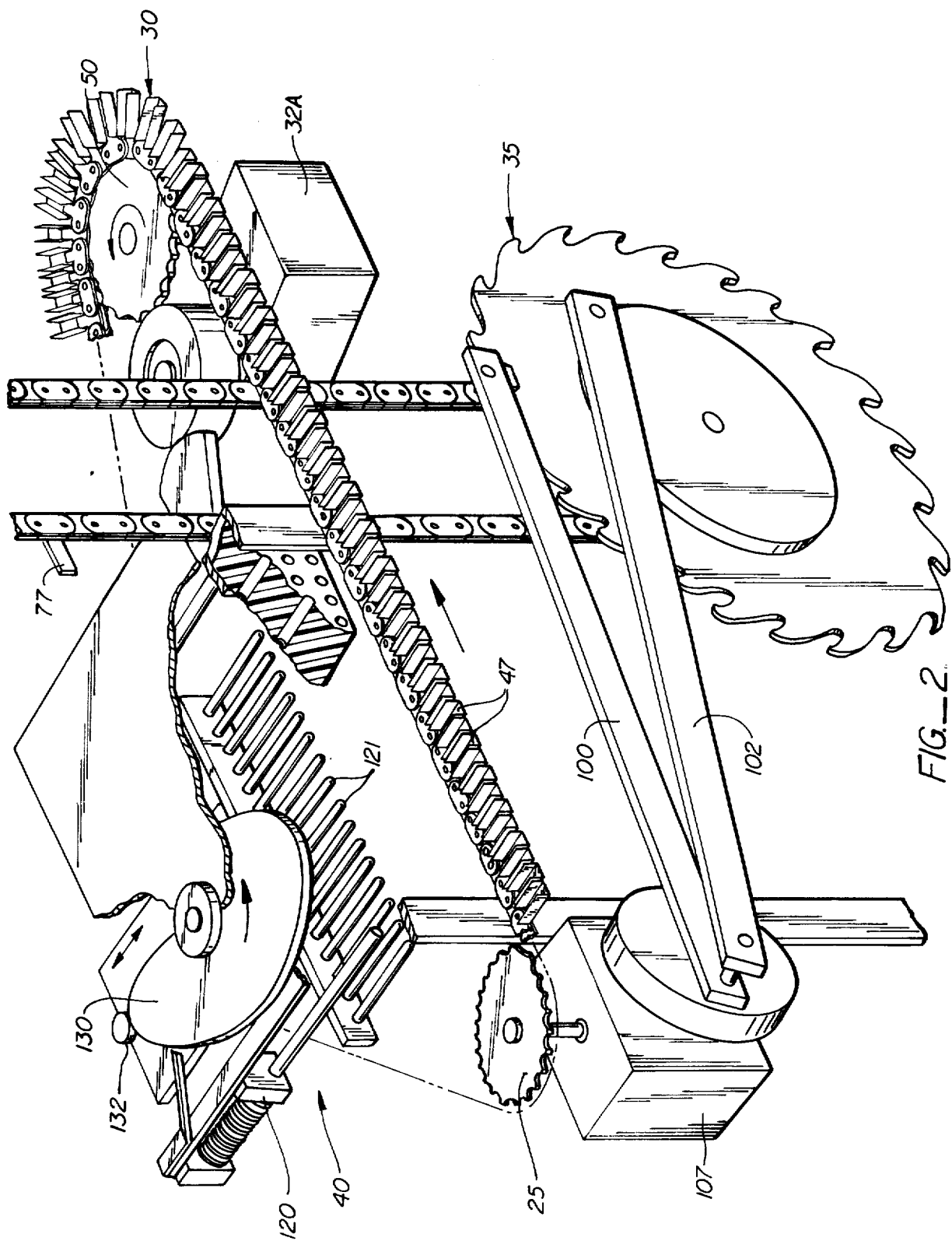

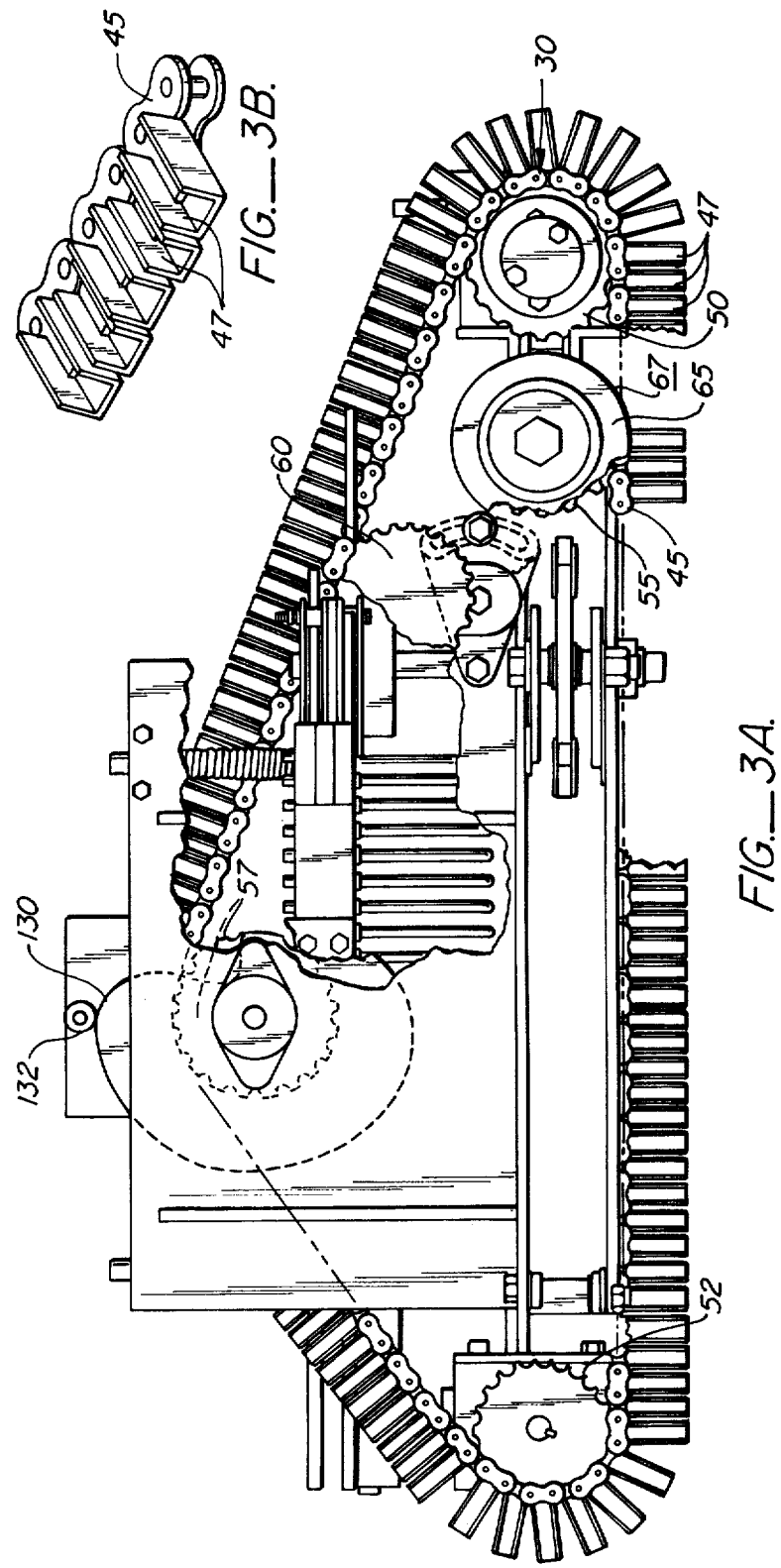

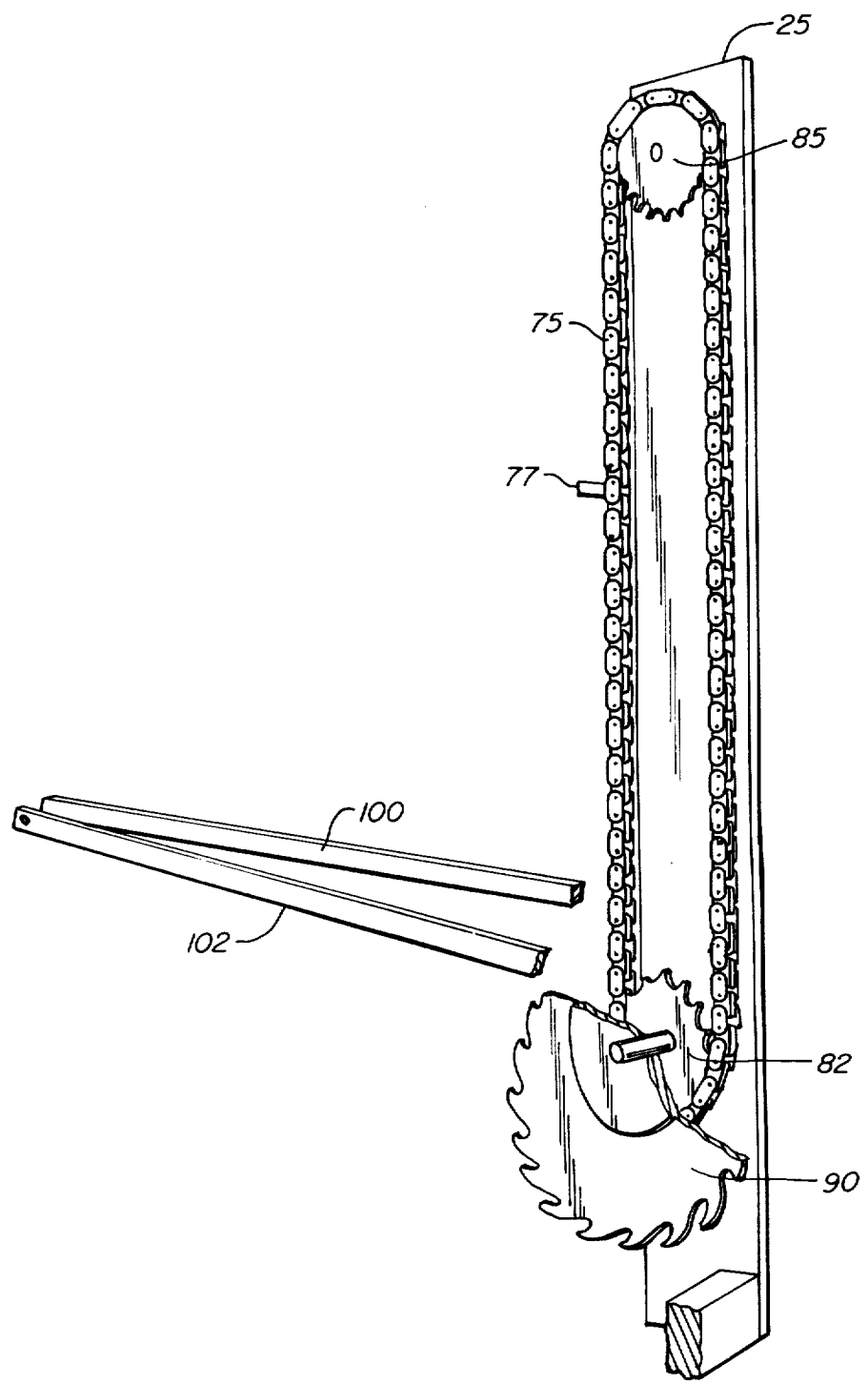
FIG._4.

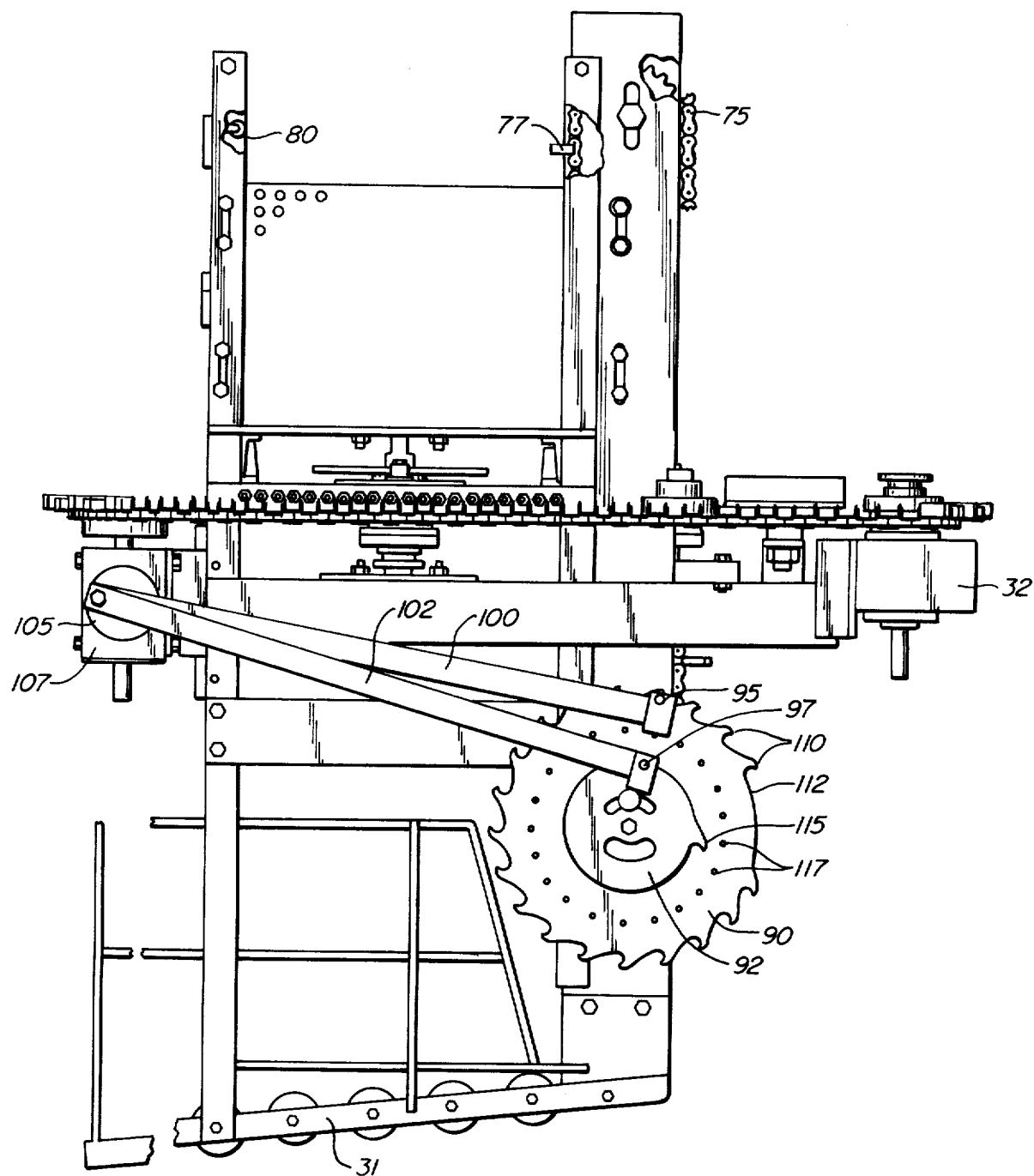
FIG._5.

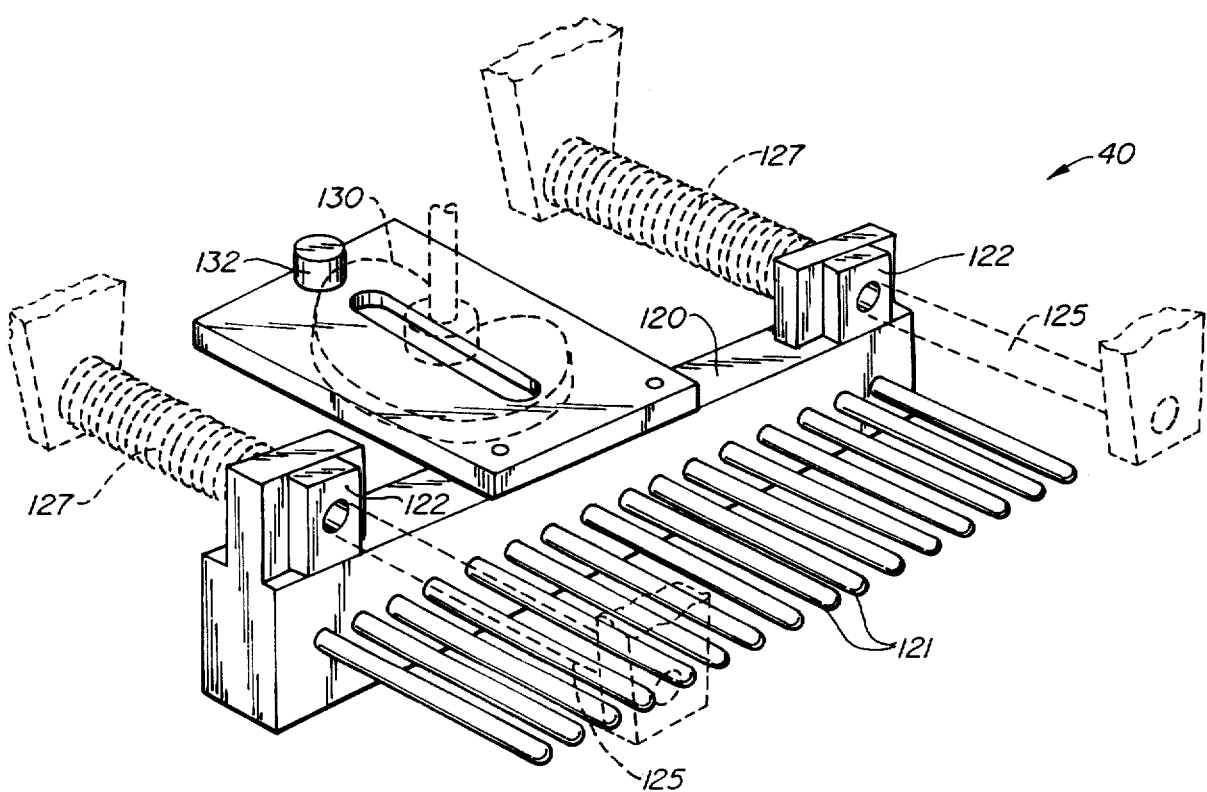
FIG._6.

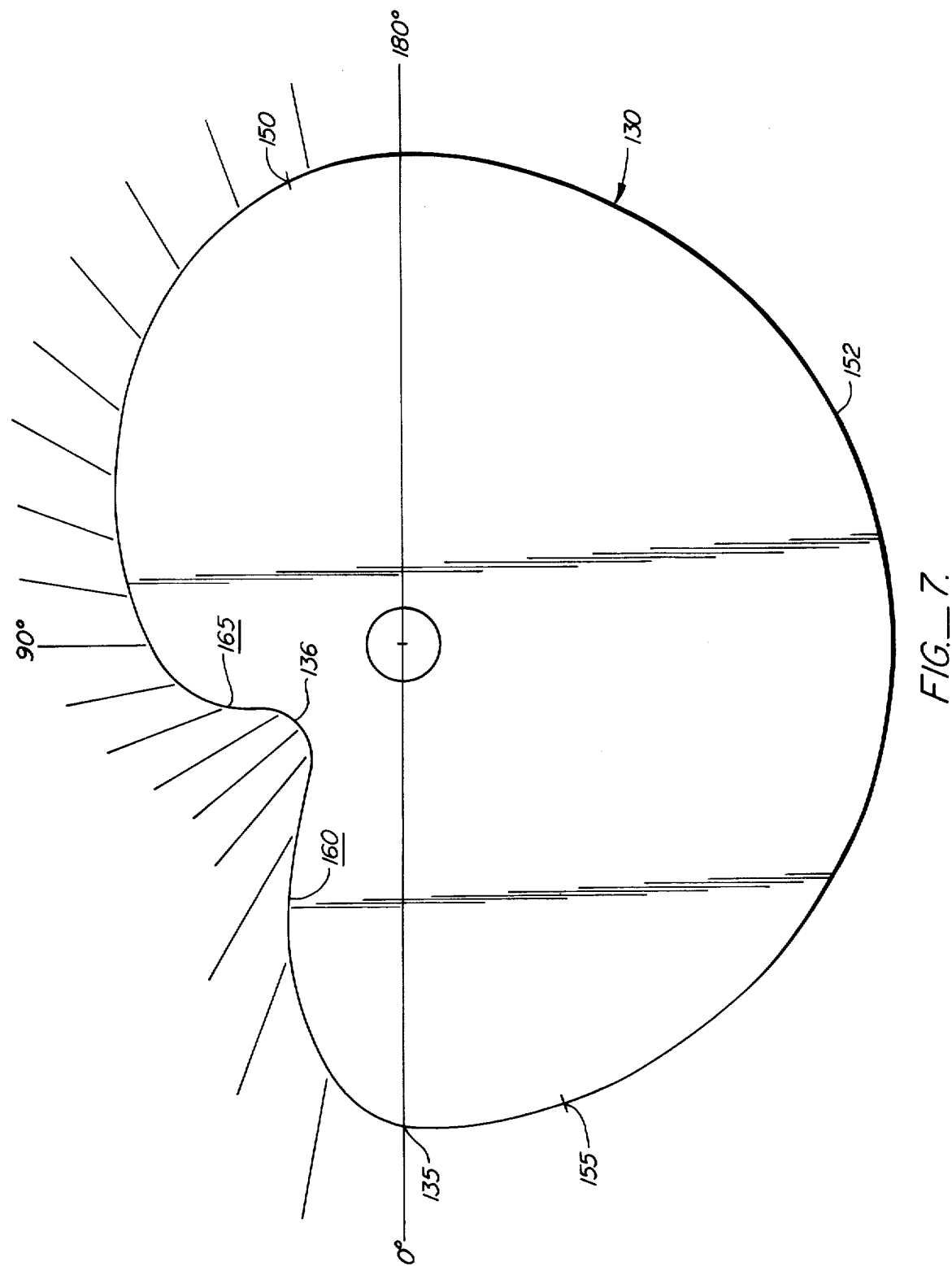

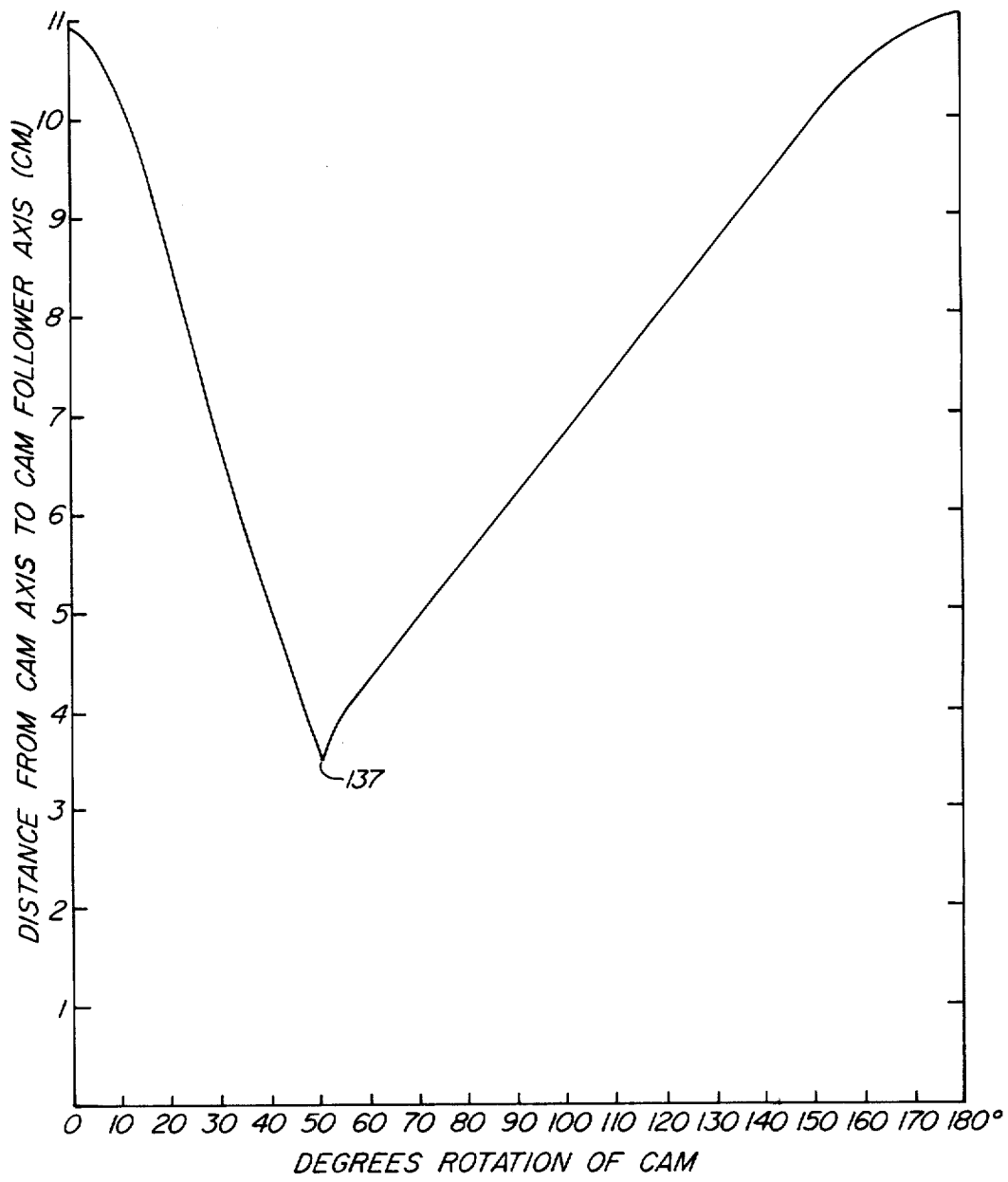
FIG._8.

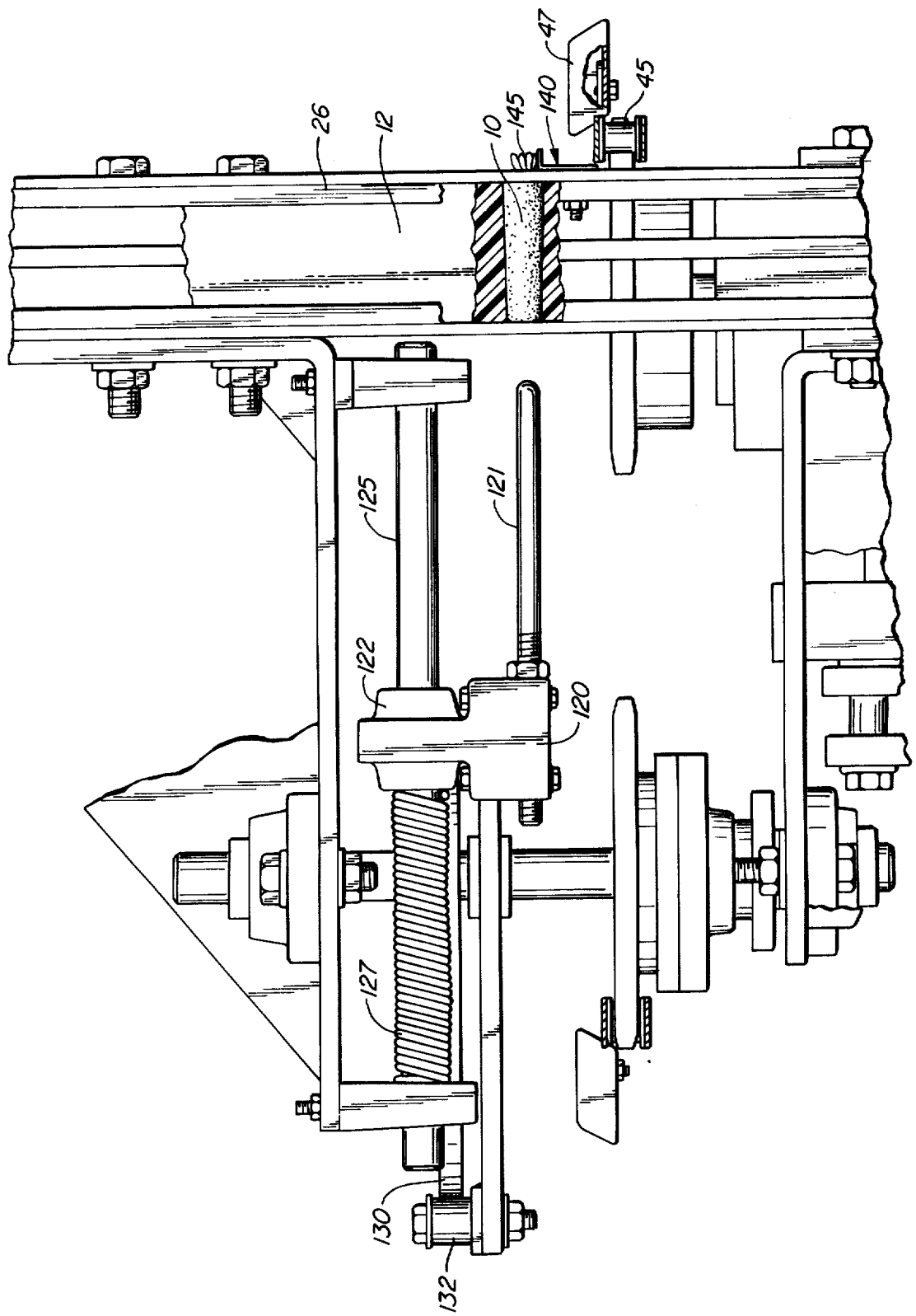

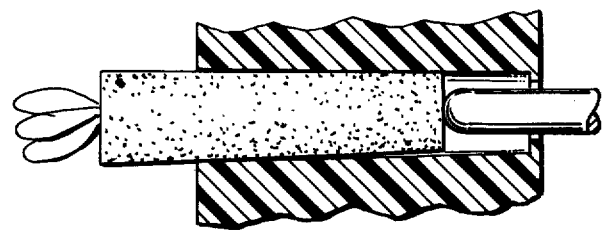
FIG._10A.
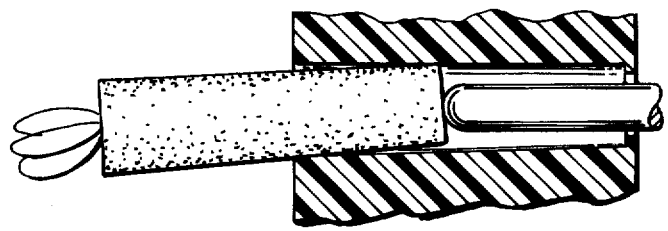
FIG._10B.
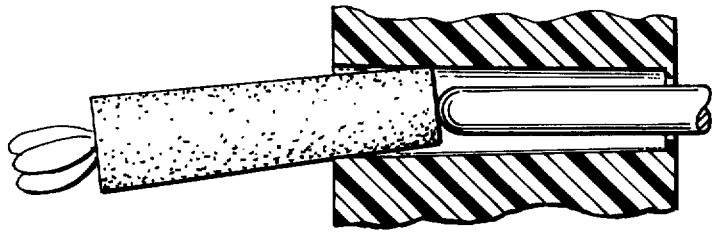
FIG._10C.
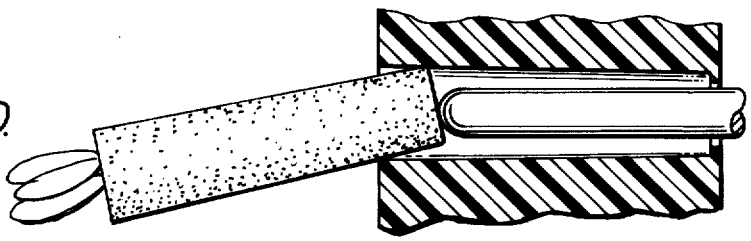
FIG._10D.
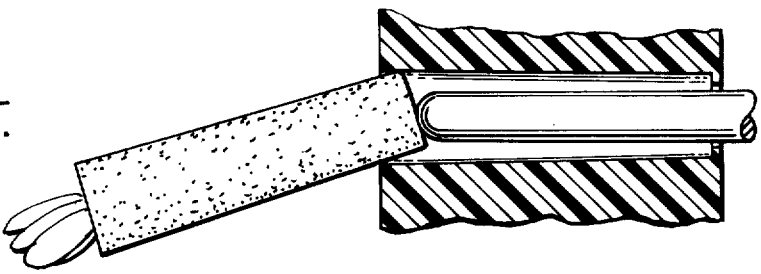
FIG._10E.
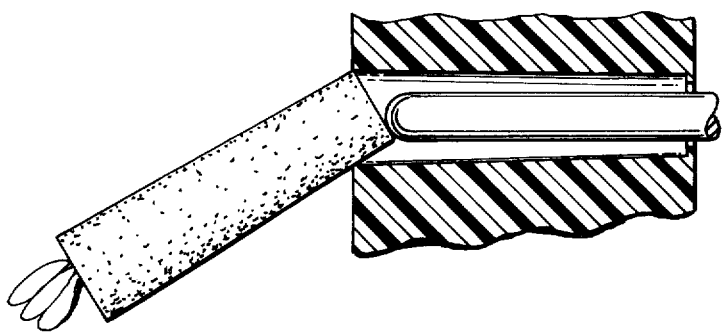
FIG._10F.

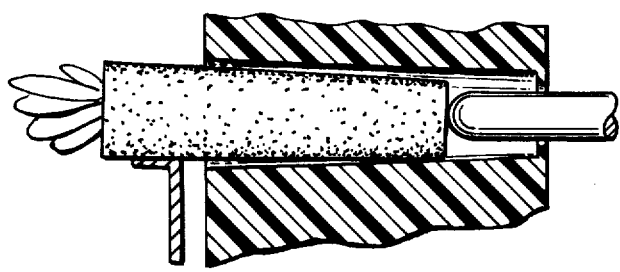
FIG._11A.
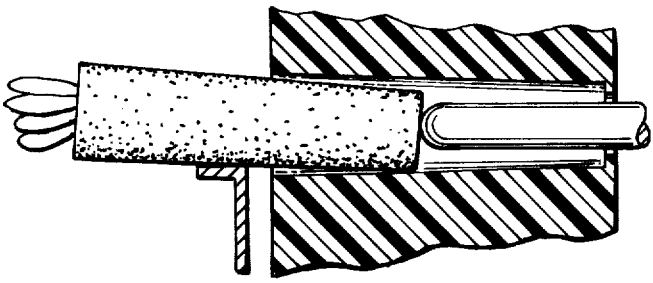
FIG._11B.
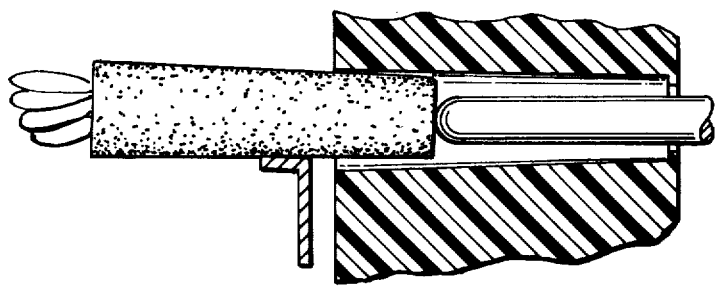
FIG._11C.
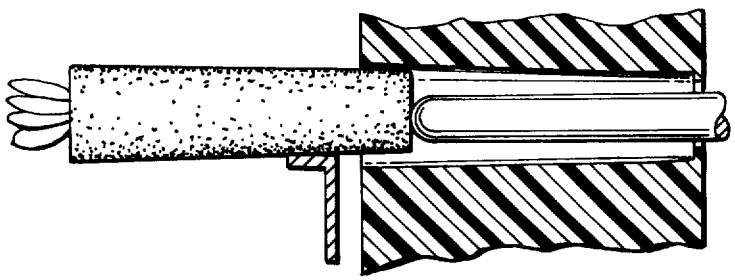
FIG._11D.
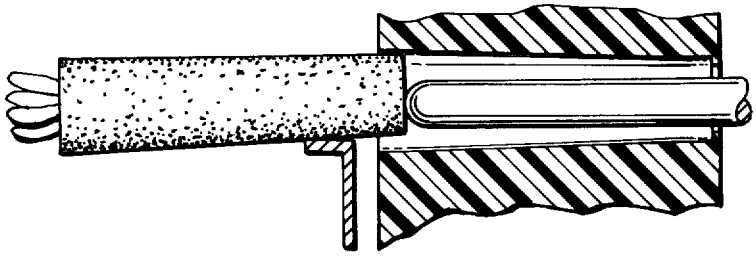
FIG._11E.
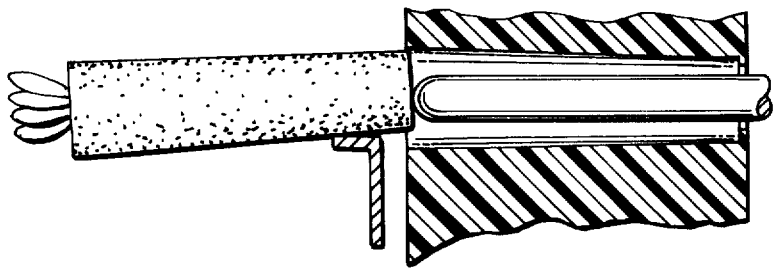
FIG._11F.

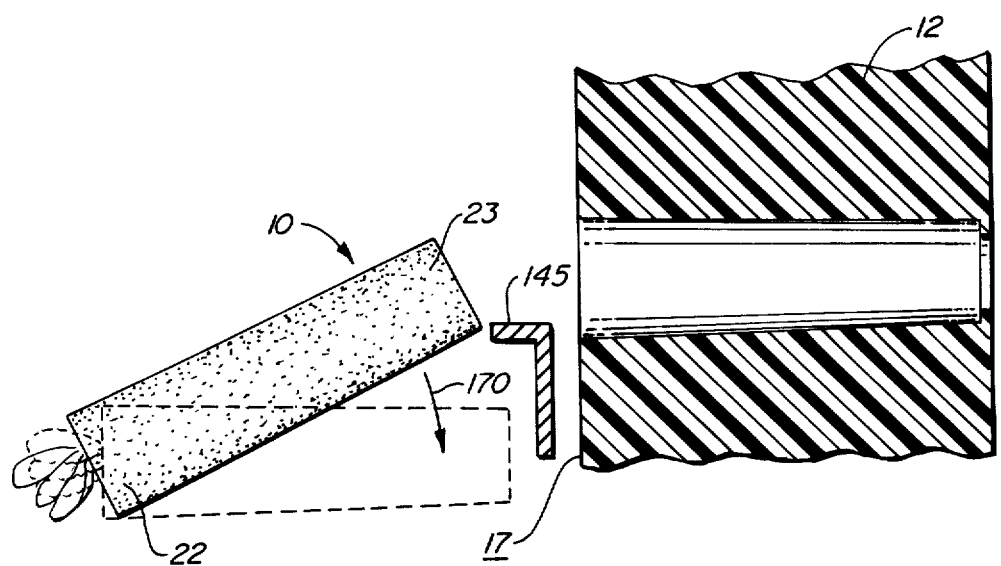
FIG._12.

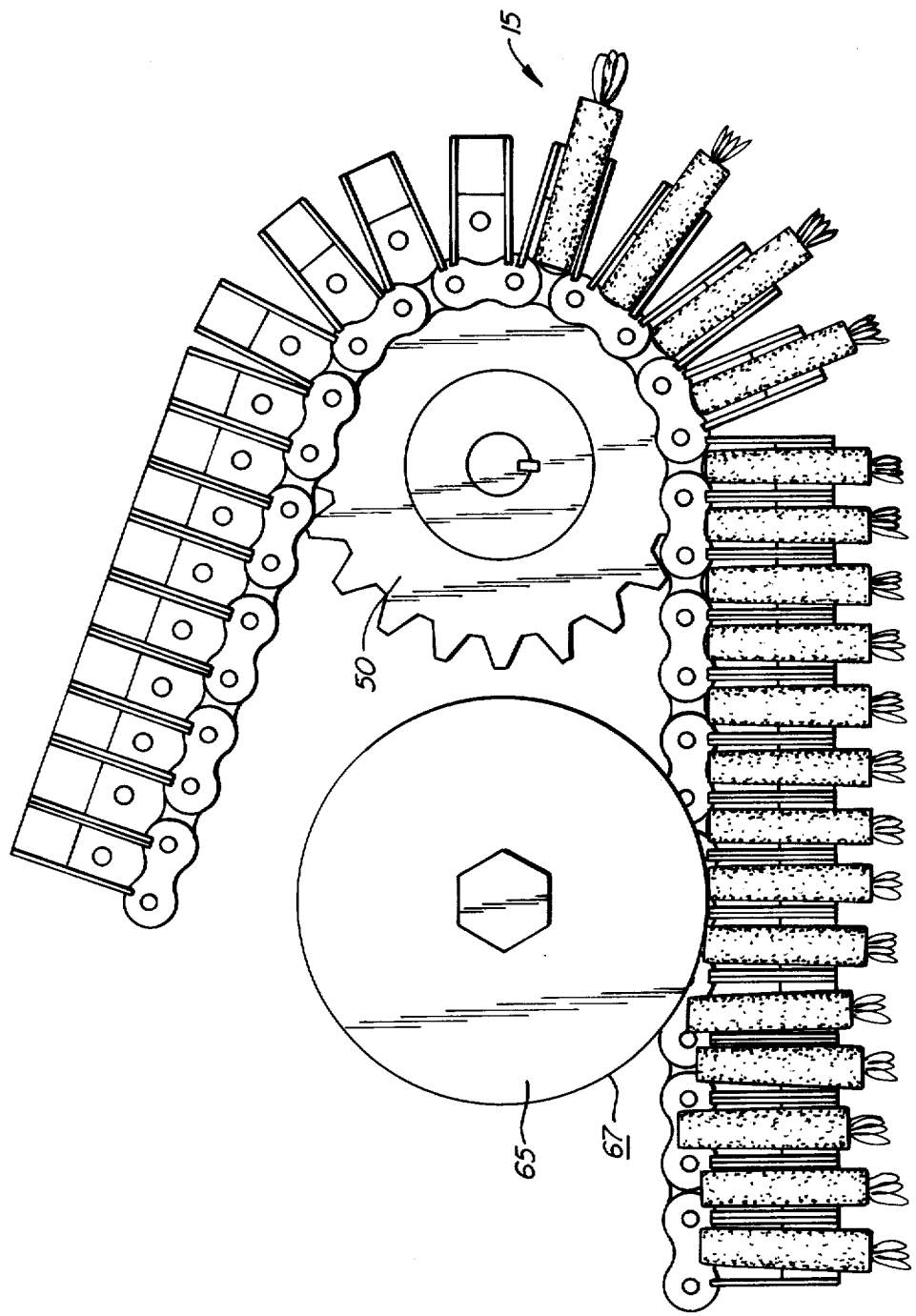
FIG_13.

AUTOMATIC SOIL PLUG LOADER AND FEEDER

FIELD OF THE INVENTION

The present invention relates generally to transplanting apparatus, and more specifically to a machine for feeding elastomeric soil plugs in an automatic transplanting system.

BACKGROUND OF THE INVENTION

The rapid automated handling of seedlings has been made possible by developments in the realm of elastomeric soil plugs (hereinafter often referred to simply as "plugs"). U.S. Pat. No. 4,130,072 and the prior art cited therein suggest growing plants within polymerized soil plugs, and by handling the plugs alone, transplanting the plugs. The soil plugs are cast from a slurry of soil and polymer in the form of small, generally cylindrical, resilient objects having a seed-receiving recess formed therein. The plugs are preferably cast in a closely spaced formation in a rectangular tray having slightly tapered cylindrical bores to define the mold cavities. After the plugs have cured in the tray they are seeded, and the seedlings are grown in the tray, typically in a greenhouse. The seedlings are allowed to attain a just sprouted condition prior to planting. The sprouted seedlings are characterized by a foliage end at the upper surface of the tray and a somewhat smaller diameter butt end at the lower surface.

Commonly owned copending application Ser. No. 150,486, filed May 16, 1980, now U.S. Pat. No. 4,355,588, discloses a transplanting machine that rapidly and accurately places plugs into the ground. The transplanting machine described therein makes it possible to achieve a planting rate and crop yield far in excess of those attainable by using prior art methods. In the transplanting machine, plug gripping clips are carried on a planting conveyor, and the plugs are presented to the passing clips on a one-to-one basis for subsequent plug placement in the ground. The above-referenced application discloses the use of a carousel feeder incorporating components of the present invention. The feeder comprises a horizontal conveyor carrying a plurality of serially disposed, closely spaced plug holders, each of which is preferably in the form of a trough. It will be readily appreciated that no matter how much the transplanting machine design is refined, an ultimate upper limit on the planting rate is set by the rate at which plugs may be transferred from the trays to the carousel troughs.

Hand loading of the plugs into plug holders has been found to be a commercially viable option, at least to the point of making the soil plug technology competitive with conventional direct seeding techniques. However, loading plugs in this manner is expensive in terms of labor costs, and the maximum speed at which a worker can load the plugs appears to set a limit on the overall planting rate that is lower than the limit imposed by other considerations.

Commonly owned copending U.S. Patent application Ser. No. 62,667, filed Aug. 1, 1979, now U.S. Pat. No. 4,294,170, is directed to a previous transplanting machine design, and discloses an automated system for repeatedly indexing the trays and ejecting plugs therefrom. Particular apertures of the tray are first indexed to correspondingly spaced apertures in a receiving device that is momentarily stationary with respect to the tray, after which a plunger mechanism is actuated to eject the plugs from the tray into the receiving device. This tray indexing and plug ejection system clearly provides many benefits in the nature of automated plug handling, but is itself not without problems. The system utilizes hydraulic actuation of the ejection pins, thus providing what is in essence a constant velocity motion. In the event that it is desired to speed up the overall operation of the machine, there is a tendency to lose the relative timing of the operations. Additionally, if a tray should happen to be slightly misregistered with respect to the ejection pins, so that the ejection pins impinge on a non-apertured portion of the tray, there is a tendency to cause damage to the tray or the machine. Moreover, the requirement of transferring plugs from the tray to a moving carousel presents some additional problems that are not addressed by the previous system.

A further consideration involves the geometric configuration of the plug loading and feeding apparatus. As discussed in the above-mentioned co-pending applications, it is common practice to plant two rows on each bed, and to plant several beds on each pass. Therefore, if the transplanting machine is to be reasonably compact, the plug loader and feeder must be confined within a relatively narrow space.

Therefore, as the art of transplanting elastomeric soil plugs becomes more and more highly developed, there is presented the need for a machine to automatically and reliably transfer plugs from the trays to the operative plug placement components of plug handling machinery.

SUMMARY OF THE INVENTION

The present invention provides an extremely compact machine for automatically removing soil plugs from the densely packed configuration of their growing tray and presenting them serially in a reliable and precisely positioned manner to appropriate plug takeup portions of an automated plug handling system.

Broadly, the plug loader and feeder according to the present invention comprises a reciprocating plug ejection mechanism operable to remove a complete row of plugs from the tray, a tray indexing mechanism for incrementally moving the tray, one row at a time, past the plug ejection mechanism, and a carousel feeder which acts first as a receiving station and then as a plug presenting system. The machine further comprises synchronous drive means for taking motion from any appropriate input drive and generating the timed motions of the above-mentioned components over each machine cycle. A machine cycle is characterized by the ejection of one row of plugs from the tray, the typically downward movement of the tray by one row, and the movement of the carousel by a distance equal to the length of a row.

The carousel comprises an endless conveyor loop, typically lying in a horizontal plane, with a plurality of plug-receiving elements, typically open-ended troughs, disposed therealong at a spacing corresponding to the plug spacing in the tray. A carousel drive sprocket is driven at the required operating speed, typically in a synchronous relationship with other components of the plug handling system. The plugs, when ejected into the carousel troughs, initially assume the same parallel, close configuration they occupied in their tray. As the parallel, closely spaced plugs begin their travel around the drive sprocket, they are gently spread apart so that they may be effectively picked up. A crowder wheel is located near the drive sprocket to precisely position the plugs longitudinally within their respective troughs.

While the carousel conveyor is driven on a continuous basis, relative to the input drive, the tray indexing mechanism is preferably operated on an intermittent basis to step the tray by one row during a predetermined portion of a machine cycle. An extra increment of movement is provided between trays. The tray moves between spaced vertical channel guides, being positively engaged by lugs mounted to a vertical tray feed chain. The tray feed chain is driven by a tray feed sprocket which derives its motion from first and second ratchets coaxially mounted thereto. The ratchets are engaged by respective pawls which are reciprocated by a linkage driven by the carousel feed chain. The use of two ratchet and pawl assemblies is dictated by the need to move the tray by a larger increment after the last row of a tray has been ejected to position the first row of the next tray.

For definiteness, consider two coplanar trays, each having 20 rows of plugs, and being spaced vertically apart from one another by the lugs so that a one row gap is presented between the top row of the lower tray and the bottom row of the upper tray. The first ratchet has its circumference divided into 21 equal angular increments, with ratchet teeth on 19 of them and a 2-tooth gap. The second ratchet has a diameter one-half that of the first ratchet, and has a single tooth. During those cycles where only one row movement is required, the first pawl engages one of the teeth on the larger ratchet, and the second pawl has free travel with respect to the smaller ratchet. This produces a one row movement on each reciprocation of the pawls. However, during the cycle where the last row of plugs has been ejected from the lower tray and it is required that two rows of displacement occur, the first pawl encounters the toothless portion of the larger ratchet, and the second pawl encounters the sole tooth on the smaller ratchet. Since the diameter is one-half, a corresponding reciprocation of the pawls produces twice the angular rotation and thus twice the tray movement.

The plug ejection mechanism comprises a reciprocable carriage having a linear array of parallel plug ejection pins disposed therealong, and guide shafts or the like to constrain the movement to one-dimensional movement perpendicular to the plane of the tray. Biasing springs urge the carriage into a so-called "engaged" position wherein the pins penetrate the mold cavity bores of the tray. A plate cam derives its motion from the carousel chain and engages a cam follower roll on the carriage to periodically urge the carriage in opposition to the springs and thus urge the carriage into a so-called "retracted" position with the pins disengaged from the tray.

A surprisingly compact configuration of components is achieved by having the cam situated proximate the rear surface of the vertically disposed tray (the lower tray surface during growing). The cam is mounted so as to be coaxial with a cam sprocket which is driven by the carousel conveyor. The cam sprocket is mounted inside the carousel conveyor loop while the cam follower roll engages the edge of the cam remote from the tray. This relative positioning permits spring loading the carriage toward the engaged position with positive cam drive toward the retracted position. Driving the cam directly from the carousel conveyor provides a mechanical linkage having a minimum number of moving parts.

The cam is configured to maintain the pins retracted during the portion of the cycle that the tray moves, and to provide a programmed movement of the carriage. The programmed movement is such that the pins initially contact the respective butt ends of the plugs at relatively low speed during the initial period when the adhesion between the plugs and the tray mold cavities is broken, and then at relatively greater speed during the balance of the movement toward the engaged position. This relatively rapid movement is continued all the way until the position of maximum engagement, (plugs fully ejected) and is abruptly reversed to provide a very quick retraction of the pins, at least over the initial portion of the pin retraction movement. The cam provides a relatively constant velocity retraction of the pins after the initial rapid movement. The significance of these movements will be described below.

Although the plug ejection occurs over a relatively small part of the machine cycle, the carousel chain still moves a distance corresponding to two or three troughs during the time that the pins are being moved from their retracted position to their engaged position. It is essential, therefore, that the plugs are ejected from their cavities in a manner that avoids fouling the passing troughs. At the same time, the continuous movement of the carousel chain requires that the plugs be ejected at an elevation that is generally minimized with respect to the trough elevation. The problem of fouling is rendered acute due to the slightly tapered configuration of the plugs and mold cavity. It will be apprecitated that as the tapered plug is pushed out of its cavity, the slightly narrower butt end finds itself in an increasingly wide portion of the cavity, and thus can only find support if the leading foliage end of the plug angulates downwardly. Thus, the foliage tends to foul the moving carousel.

Surprisingly, it has been found that the plug ejection may be rendered reliable and effective by interfering with the plugs' travel. In particular, the problem of downward angulation is overcome by the provision of a lip that extends horizontally in a direction parallel to the row of cavities, the lip being located generally proximate the front surface of the tray (the upper tray surface during growing), and being disposed with its upper edge slightly above the lowest part of the cavities, that is, with the upper edge intruding a short distance into the path of the plugs. The lip thus acts to deflect the plugs upwardly as they are ejected, and provides a line of support that cooperates with the upper portions of the cavities' respective inner surfaces to prevent the plugs from angulating downwardly as they pass out of their respective cavities. The lip, while an unlikely candidate for improving the reliability of the ejection operation, provides yet further unexpected benefits by eliminating possible fouling between the butt ends of moving plugs and the foliage of plugs in the next row. In particular, the lip is preferably in the form of an angle member having a horizontal shelf portion and a vertical support portion. As the plugs are ejected from the tray, at the point that the butt end of the plug clears the tray and is pushed past the edge of the shelf portion of the lip, downward angulation of the foliage end occurs, to the point that the foliage end contacts the front of the trough. At this point, the plug rotates about the contact point, and having been pushed off the shelf, the butt end swings under the shelf. Thus, the horizontal shelf portion of the lip prevents interference between the foliage of the plugs in the next row as it is lowered and the butt ends of the last several plugs in the preceeding row as they move past.

The cam timing over that portion of the cycle wherein ejection is occuring may be understood at this point. In particular, as mentioned above, the cam incorporates the feature of providing substantially zero dwell at the maximally engaged position of the pins. Once the pins have pushed the butt ends of the plugs past the edge of the shelf, the cam effects an immediate retraction of the pins from the vicinity of the plugs so that the pins do not foul the butt end of the plugs, the foliage ends of which are falling into the troughs. It is further required that the final movement of the pins into the fully engaged position be at relatively high speed. A failure to push the plugs quickly past the edge of the shelf would result in the plugs being flipped since they would have undergone considerable downward angulation while continuing to be pushed.

The rather abrupt reversal of the cam follower between conditions of maximum speed places certain structural constraints on the cam mechanism, being typically accompanied by rather steep cam angles and relatively large side thrusts on the cam follower. However, the spring biasing of the ejector carriage provides a number of benefits. With the pins fully engaged, the spring is not compressed, and thus offers minimum resistance to movement of the cam follower. At the same time, the use of a spring loaded carriage rather than a positively driven one allows the springs to provide the driving force as the pins are moved to their engaged position with the cam follower merely controlling the rate at which the springs extend. This provides a safety margin in the unlikely event that the tray is improperly indexed, since the pins would harmlessly impinge on the back surface of the tray being urged by the spring and not the cam. The optimized ejection sequence with the velocity of the pins at various points in the cycle being defined by the cam surface, allows the optimized ejection to maintained over a wide range of operating speeds.

Thus, the plug loading machine of the present invention reliably loads the plugs into the troughs, and precisely positions the plugs for pick up by other components of the plug handing machinery. The reliable placement of the plugs into the troughs occurs because the plugs that are being ejected are isolated from the moving carousel until they drop, and then are quickly isolated from the ejection pins and stationary portions of the structure. The lip and shelf serve initially to prevent the foliage ends of the plugs from being snagged by the passing troughs, and subsequently to prevent the butt ends of the ejected and loaded plugs from snagging the next row of plugs. The quick retraction of pins from their position of maximum engagement allows the controlled drop of the plugs to occur without impediment. The operation of the lip in cooperation with the plug ejection carriage and pins is optimized by feeding the trays positively so that the plug cavities in the tray are precisely positioned with respect to the lip. At the same time, the spring loading of the ejection carriage provides a built-in safety feature in the unlikely event that misalignment occurs with the pins hitting the rear surface of the tray between cavities.

The plugs in the carousel troughs are precisely positioned for subsequent pick up. Longitudinal alignment is provided by the crowder wheel, while the fan-out accompanying the passage of the carousel chain around the carousel drive sprocket effects a clear separation of plugs from one another.

The ejection of a complete row of plugs at a time enhances the alignment of the plugs and the reliable placement into the troughs. In particular, it will be realized that during the ejection of a row of plugs, the foliage of a given plug is capable of being fouled by the foliage of at most one other plug, namely that in the row immediately above. This is to be contrasted with the situation where a plug is being removed from a tray with neighboring plugs on three or more sides. Once the plugs in the row have been ejected from the tray, the interaction between neighboring plugs is such that the plugs have a tendency to maintain one another in proper parallel alignment so that they drop into the troughs as required. The close spacing of plugs in the tray, dictated in large part by the desire to maximize the number of plugs per tray and the number of plugs that can be grown in a given size greenhouse, provides the unexpected benefit of self-alignment as the plugs are ejected. Once in the troughs, the plugs maintain their initial close packed configuration until they are gently brought into a widely spaced configuration prior to pick up. Again, each plug need only be separated from one plug at a time (the plug immediately following it on the carousel chain), so that interference between the foliage of neighboring plugs is minimized. Furthermore, it has been unexpectedly found that the incorporation of the plug feeding machine into a piece of agricultural equipment that is moved over the field and thus subjected to relatively rough motion, actually enhances the reliable placement of plugs into their respective troughs, rather than diminishes it as would be expected when such a precision operation is visualized.

For a further understanding of the nature and advantages of the present invention, reference should be made to the remaining portions of the specification and to the attached drawings.

BRIEF DESCRIPTION OF THE DRAWINGS

FIG. 1A is an overall perspective view of an automatic soil plug loader and feeder according to the present invention;

FIG. 1B is a partially cut-away fragmentary perspective view of a plug in its tray cavity;

FIG. 2 is a partially cut-away perspective view showing the operative relationship of the major components;

FIG. 3A is a partially cut-away top plan view showing the configuration of the carousel feeder and the relationship of the other components thereto;

FIG. 3B is a fragmentary isometric view of a portion of the carousel conveyor showing the trough configuration;

FIG. 4 is a partially cut-away isometric view of the tray feed chain and drive;

FIG. 5 is a partially cut-away front elevational view showing the tray indexing mechanism;

FIG. 6 is an isometric view of the plug ejection carriage;

FIG. 7 is a plan view of the cam;

FIG. 8 is a graphical representation of the carriage motion as defined by the cam;

FIG. 9 is a partially cut-away side elevational view showing the plug ejection mechanism;

FIGS. 10A–F are sequential schematic side views illustrating the phenomenon of downward angulation of a plug undergoing ejection;

FIGS. 11A–F are schematic side views illustrating the action of the lip to prevent the angulation;

FIG. 12 is a schematic side view illustrating the angulation of the butt end of the plug under the shelf; and FIG. 13 is a schematic top plan view illustrating the operation of the crowder wheel and carousel drive sprocket.

DESCRIPTION OF THE PREFERRED EMBODIMENTS

Overview of Structure and Operation

FIG. 1A is a perspective view illustrating a plug loading and feeding machine 5 according to the present invention. In operation, machine 5 removes elastomeric soil plugs 10 from their growing trays 12, and serially presents the plugs at a take-up position 15 for subsequent manipulation by other components of an automated plug handling system. For example, the above-mentioned copending patent application Ser. No. 150,486, discloses the use of a carousel feeder in the context of an automatic soil transplanting machine, and the disclosure therein is hereby incorporated by reference.

Plugs 10 are cast in a closely spaced formation of rows and columns in their respective growing trays. A convenient size of tray accommodates 400 plugs in twenty rows of twenty plugs each, the plugs being spaced on ⅝-inch centers. With additional reference to FIG. 1B, tray 12 can be seen to have a front surface 17 and a rear surface 18, being the same as the top and bottom surfaces when the tray assumes a horizontal position during growing. A given plug 10 occupies a slightly tapered generally cylindrical mold cavity 20, the plug having a ½-inch diameter at its foliage end 22 and a 7/16-inch diameter at its butt end 23.

Referring also to FIG. 2, the general sequence of operations of machine 5 may be described. Trays 12 are maintained in vertical orientation and are fed downwardly between spaced vertical tray guides 25 and 26. The plugs are ejected, one row at a time, into a horizontally disposed carousel 30 for transport to take-up point 15. Empty trays are transported away from the vicinity of machine 5 by an empty tray conveyor 31. A windshield 32 is mounted around the plug-carrying portions of carousel 30 so that the plug ejection and transport are not hindered by possibly inhospitable conditions in the field. Input power to machine 5 is supplied at an input gearbox 33 that is driven in synchronization with other components of the plug handling equipment.

Machine 5 comprises, in addition to carousel 30, a tray indexing mechanism 35 and a plug ejection mechanism 40. In operation, tray indexing mechanism 35 transports tray 12 vertically downward to a position with a row of plugs to be ejected in operative alignment with plug ejection mechanism 40. The row of plugs is then ejected from tray 12, the plugs being received by carousel 30 which acts first as a receiving station and then as a plug presenting system. Tray indexing mechanism 35 then moves tray 12 downward by one row to repeat the cycle.

In order to generate the timed motions of tray indexing mechanism 35 and plug ejection mechanism 40, synchronous drive means deriving their motion from the motion of carousel 30 are employed, as will be described more fully below. Although the input power could be supplied to any machine component, with the remaining components being timed relative thereto, the preferred embodiment utilizes the movement of carousel 30 to generate the other motions. Further, while there is no requirement that the input power be uniform, it is nevertheless conceptually convenient to consider carousel 30 as moving uniformly with the motions of tray indexing mechanism 35 and plug ejection mechanism 40 occuring in an intermittent fashion at particular times of the machine cycle.

Detailed Structure

Turning now to the specific structural details of machine 5, carousel 30, tray indexing mechanism 35, and plug ejection mechanism 40 will be described in order.

Carousel 30 may be described with reference to FIGS. 2, 3A, 3B, and 4. Carousel 30 comprises a carousel conveyor, preferably in the form of a chain loop 45, and carries a plurality of plug receiving troughs 47 mounted at a center-to-center spacing corresponding to the spacing of plugs 10 in their rows in tray 12. In this instance, the spacing is ⅝-inch, allowing carousel chain 45 to be conveniently fabricated from standard No. 50 roller chain (⅝-inch links). Carousel chain 45 is driven by a carousel drive sprocket 50 that derives its motion from input gear box 33, and further engages a carousel return sprocket 52, a crowder wheel sprocket 55, and a cam sprocket 57. Tension on carousel chain 45 is maintained by a tension idler 60.

Troughs 47 are open at both ends, and are sized to precisely register plugs 10 in the radial dimension. A crowder wheel 65 is coaxially mounted to crowder wheel sprocket 55, and includes a cylindrical outer peripherial portion 67 that is at a position substantially adjacent the open ends of passing carousel troughs 47.

Tray indexing mechanism 35 may be described with reference to FIGS. 2, 4, and 5. As mentioned above, trays 12 are maintained in a vertical condition between spaced tray guides 25 and 26. A vertical tray feed chain 75 travels downwardly within tray guide 25, and has a plurality of protruding tray engaging lugs 77 mounted thereto. Adjacent lugs 77 are spaced to accommodate a tray therebetween in order to provide tray support and positive tray drive upon movement of tray feed chain 75. Lugs 77 are sized such that the uppermost row of a lower tray is spaced from the lowermost row of an upper tray by 1¼ inches, that is, such that a 1-row gap exists between the adjacent rows on succeeding trays. Spring loaded rollers 80 are disposed within guide 26 to bias tray 12 toward tray feed chain 75. Tray feed chain 75 engages a lower tray feed drive sprocket 82 and an upper tray feed return sprocket 85.

Tray feed drive sprocket 82 derives its motion from first and second ratchets 90 and 92, coaxially mounted thereto. The purpose of the two ratchets, as will be more fully described below, is to rotate tray feed drive sprocket 82 twice as far over those machine cycles where the last row of plugs has been ejected from a lower tray and the first row of plugs in a succeeding overlying tray must be brought into operative alignment with plug ejection mechanism 40. Ratchets 90 and 92 are engaged by a respective pawls 95 and 97 on respective pawl arms 100 and 102. Pawl arms 100 and 102 are reciprocated by the rotation of a crank 105 which derives its motion from a tray feed gear box 107 driven by carousel return sprocket 52.

The configuration and operation of ratchets 90 and 92 are best understood with reference to definite numerical parameters. Assume, as above, that each tray includes 20 rows, and that the size of lugs 77 is such that a 1-row gap is presented between the top row of the lower tray and the bottom row of the upper tray. In the preferred embodiment, tray feed chain 75 is also No. 50 roller chain having its links at a spacing corresponding to the spacing of rows in tray 12. Tray feed drive sprocket 82 is a 21-tooth sprocket, a 1-tooth rotation of which causes downward movement of tray 12 by 1 row. First ratchet 90 has its circumference divided into 21 equal angular increments, with ratchet teeth 110 on 19 of the increments, and a 2-tooth gap 112 covering the remaining two increments. Second ratchet 92 has a diameter one-half that of first ratchet 90, and has a single tooth 115 at a position on its circumference angularly within 2-tooth gap 112. Tray feed gear box 107 and carousel return sprocket 52 are configured to provide a full rotation of crank 105 on each machine cycle (corresponding to the passage of 20 troughs past a given point). Apertures 117 on ratchet 90 cooperate with a spring-loaded ball detent (not shown) to maintain tray feed drive sprocket 82 in a position so a row of plugs is in operative alignment with plug ejection mechanism 40.

Plug ejection mechanism 40 may be described with reference to FIGS. 2, 6, 7, 8, and 9. Plug ejection mechanism 40 comprises a reciprocable carriage 120 having a plurality of parallel, coplanar plug ejection pins 121 mounted thereto. Carriage 120 carries parallel spaced sleeve bearings 122 that slide along respective fixed parallel guide shafts 125 extending perpendicularly away from the rear surface of tray 12. Respective biasing springs 127 are disposed coaxially about guide shafts 125, and engage carriage 120 so as to urge carriage 120 toward tray 12. A plate cam 130 is mounted coaxially to cam sprocket 57 and engages a cam follower 132 mounted to carriage 120. Cam 130 engages cam follower 132 on that portion of the cam edge that is farthest from tray 12.

FIG. 7 shows the profile of cam 130, but it must be remembered that a particular cam profile has significance only when considered in conjunction with the cooperating cam follower. The preferred embodiment of cam follower 132 is a cylindrical roller. It is convenient for the purpose of unambiguously denoting various points on the cam to define an angular coordinate system relative to the cam, having an origin 135 and increasing in a positive sense in an opposite direction to the rotation of the cam so that cam follower 132 engages cam 130 at an angular coordinate that increases from 0° through 360°. It will sometimes be convenient to refer to a part of the cycle by the corresponding angular coordinate. The range of 0°-180° is characterized by a varying cam radius while the range of 180°-360° is characterized by a constant maximum cam radius. A point 136 of minimum radius occurs at about 50°.

FIG. 8 graphically represents the distance of the cam follower axis from the cam axis as a function of the angular position of the cam follower axis. For a constant carousel speed, the slope of the graph provides a representation of carriage velocity. Only angles from 0° to 180° are shown, since the position of cam follower 132 is constant over the angular range of 180°-360°. The significance of the particular motion impressed on cam follower 132 and carriage 120 therewith will be described more fully below. The most striking feature of the cam follower movement is the fact that there is substantially zero dwell at the position of closest approach, as reflected by a cusp 137 on the graph. Moreover, the speed at which cam follower 132 moves (the absolute value of the slope on the graph) is maintained at a high value immediately before and immediately after the abrupt reversal. In fact, immediately after the reversal, an increased speed is maintained for a short period of time for reasons to be made clear below. To effect this rapid movement on both sides of the cusp, the cam surface is configured at a sharp angle with respect to the radius.

A further feature of the plug ejection mechanism is shown in the side elevational view of FIG. 9. An elongate right angle lip 140 extends along an axis parallel to front surface 17 of tray 12 and is characterized by a vertical support portion 142 and a horizontal shelf portion 145. Lip 140 is located proximate front surface 17, typically at a distance of ⅛-inch, while the top surface of horizontal shelf portion 145 is slightly above the lowest portion of cavity 20, typically by approximately 1/16-inch. Thus, lip 140 actually intrudes into the path of a plug that is being ejected. The width of shelf portion 145 is such that pins 121 extend past the shelf edge when carriage 120 is completely engaged. As will be described below, the operation of lip 140 is especially significant when plugs 10 are characterized by a considerable amount of foliage, with the consequence that the center of gravity is displaced toward the foliage end.

Operation

The operation that occurs as carousel drive sprocket 50 is driven may now be described. Cam 130 and crank 105 are driven by their respective sprockets so that they rotate at a constant rate relative to the rotation of drive sprocket 50. The plug ejection and tray movement take place over essentially separate parts of the cycle, and may be conveniently described with respect to the angular coordinate system defined with respect to cam 130.

Consider first the operation of tray indexing mechanism 35. The entire tray movement occurs over that portion of the cycle that cam follower 132 is engaged by the portion of cam 130 having maximum radius, thus insuring that carriage 120 is in the fully retracted position. Since the pawl arms are driven by a crank, they undergo a reciprocating motion so that during half of the cycle the pawls are moving in a direction so as to override a particular ratchet tooth, and in the other half of the cycle, the pawls are moving in a direction tending to engage the ratchet tooth most recently overridden. Depending on the absolute angular position of the ratchets, pawl 95 will override and then engage one of teeth 110 on ratchet 90, or pawl 97 will override and then engage tooth 115 on ratchet 92.

At approximately 165° of the cycle, indicated schematically as point 150, the pawls begin their movement back towards a position of engagement, and undergo free travel into engagement until approximately 245°, indicated schematically as point 152. Continued progress through the cycle causes one or the other of the pawls to engage the appropriate ratchet tooth, causing rotation of the ratchets with consequential rotation of tray feed drive sprocket 82. This movement occurs until approximately 345° of the cycle, indicated schematically as point 155. At this point, tray 12 stops moving and the ball detent snaps into the corresponding one of apertures 117. The portion until 360° is a grace period during which time neither the trays nor the carriage is moving.

It will be recalled that first ratchet 90 has a 2-tooth gap, so that pawl 100 does not engage ratchet 90 when the pawl is moving over the toothless portion of the periphery. However, second ratchet 92 has its sole tooth located at an angular position to be engaged by second pawl 97 during the machine cycle that first pawl 95 has free travel over the gap on first ratchet 90. Since ratchet 92 is half the diameter of ratchet 90, the corresponding reciprocation results in twice as large an angular rotation, thus causing twice as large a tray advance. Thus, after twenty rows have been ejected, a tray movement of twice the normal increment is produced by the dual ratchet system.

Consider next the movement of carriage 120 and pins 121 therewith. Movement of carriage 120 commences when cam follower 132 is engaged by portions of cam 130 having less than the maximum diameter, that is, over 0°-180° of the cycle. The first 10° or so of cam rotation cause sufficient movement to bring the ends of ejection pins 121 flush with rear surface 18 of tray 12. During the next 40° or so of rotation, cam follower 132 rides down a portion 160 of sharply decreasing radius until minimum radius point 136 is reached. The internal radius of the cam surface at point 136 is configured to match the outer radius of cam follower 132, so that movement past minimum radius point 136 causes immediate reversal of the carriage movement. The cam radius increases very sharply over the angular range 165 immediately following the point 136 in order to effect a very rapid retraction of pins 121 to prevent any fouling between the pins and the butt ends of the plugs. The portion of the cycle from approximately 90° to 180° is characterized a relatively uniform retraction of carriage 120 and pins 121.

The operation of lip 140 may now be described. As discussed above, plugs 10 are slightly tapered, having been cast and cured in correspondingly tapered tray cavities 20. Thus, as a plug is ejected from its cavity, its butt end becomes progressively more loosely held as it passes into a region of increasing diameter. In those cases where the plugs are characterized by relatively heavy foliage at the foliage ends, the center of gravity is displaced toward the foliage end, and as the plug is pushed out of its cavity, the foliage end tends to angulate downwardly. FIGS. 10A-F illustrate the downward angulation that would occur in the absence of lip 140 as a given plug 10 is progressively ejected from its cavity. In particular, it can be seen that once the center of gravity has been moved past front surface 17 of tray 12, a gravitational torque acting about the lowest point in cavity 20 causes foliage end 22 to angulate downwardly, with butt end 23 contacting the upper internal surface of mold cavity 20. As the downward angulation progresses, the foliage of the plug is sufficiently low that it is in a position to foul the passing carousel troughs. Even though the ejection occurs over a relatively small portion of the machine's cycle, there is a movement of two or three troughs past a given point during that time that the downward angulation is occurring.

FIGS. 11A-F illustrate the action of lip 140 in counteracting the downward angulation. As can be seen, the lip protrudes into the path of the plug as it is being ejected, actually deflecting the plug upwardly until the final stages of ejection, at which point the plug is generally horizontal. Thus, once the respective butt ends of the plugs clear front tray surface 17, the plugs are all in a corresponding generally horizontal orientation so that they may uniformly fall into their troughs. Due to the closely spaced condition of the plugs, being ejected en masse, the plugs tend to maintain one another in parallel alignment so that they may fall into their respective troughs.

FIG. 12 illustrates the feature of the present invention that prevents the butt ends of the plugs, once in their troughs, from being fouled by plugs in the next row to be ejected. In particular, when carriage 120 has been moved to its fully engaged position with ejection pins 121 extending beyond horizontal shelf portion 145 of lip 140, foliage end 22 has had an opportunity to angulate downwardly to enter trough 47. Then, butt end 23 angulates downwardly under the influence of gravity, as indicated by arrow 170, with plug 10 assuming a final position, shown in phantom, with butt end 23 tucked underneath horizontal shelf portion 145.

FIG. 13 illustrates the operation of crowder wheel 65 and carousel drive sprocket 50 in presenting plugs 10 in a precisely registered and singulated condition at take-up point 15. In particular, the respective butt ends of the just-ejected plugs are characterized by a degree of unevenness in the axial location thereof. However, as the plugs pass crowder wheel 65, cylindrical outer portion 67 of the crowder wheel contacts the butt ends of successive plugs and urges them so that the plugs assume a uniform axial position in their respective troughs. At this point the plugs are still in their closely spaced parallel configuration. However, as the plugs begin their passage around carousel drive sprocket 50, they assume a radial position with respect to sprocket 50, with the consequence that the foliage ends thereof become separated from one another to allow the plugs to be picked up, one at a time, by other portions of the plug handling machinery.

Although steep cam angles are typically accompanied by rather large side thrusts on the cam follower, problems related to this are minimized due to the spring loading of the carriage. In particular, over the portion of cam rotation from 0° to approximately 50° of the cycle, the carriage moves under the influence of biasing springs 127, to the extent allowed by the cam, while over the next 30° of rotation, during which cam follower 132 rides up on steep portion 165, springs 127 are generally fully extended and therefore offer minimum resistance to compression (and thus to cam rotation).

The need for rapid movement of the pins immediately before the position of maximum travel is dictated by the requirement that the plugs be pushed quickly past the edge of the shelf before significant downward angulation has occurred. A failure to do so would result in the plugs being flipped.

In summary it can be seen that the present invention provides a surprisingly effective machine that quickly and effectively removes soil plugs from their growing trays and presents them serially to plug take up components of an automated plug handling system. Large numbers of plugs are reliably transferred to relatively moving plug receiving troughs in a manner that avoids fouling of the plugs prior to ejection by the moving troughs and after ejection by the relatively stationary ejection pins and succeeding rows of plugs.

While the above provides a full and complete description of the preferred embodiments of the present invention, various modifications, alternate constructions, and equivalents may be employed without departing from the true spirit and scope of the invention. For example, while the preferred embodiment utilizes roller chain and rigidly mounted troughs, it would also be possible to have the carousel conveyor fabricated from timing belt material having troughs integrally cast thereon in a resilient manner. Such a construction would allow the troughs to be tilted prior to pick up which may be more convenient for certain types of plug handling equipment. Additionally, while separate pawl arms are shown, it is possible to have both pawls mounted on a single pawl reciprocating element. Therefore, the above description should not construed as limiting the scope of the invention which is defined by the appended claims.

We claim:

1. Apparatus for transferring soil plugs, each plug having a foliage end and a butt end, from a densely packed configuration of plural rows in a growing tray to a singulated condition available for subsequent handling, comprising:

plug ejection means operable upon reciprocation thereof to assume an engaged position to eject a row of plugs from said tray;

reciprocation means operable to intermittently reciprocate said plug ejection means to effect ejection of said row of plugs;

tray indexing means operable to incrementally move said tray so that each row assumes a position of operative alignment with said plug ejection means for sequential ejection of said row of plugs in said trays;

feeder means including upwardly open horizontal troughs operable to receive a complete row of ejected plugs and transport said ejected plugs to a plug pick up location;

means for transporting said plugs in said feeder means over a path portion of substantial curvature to cause the foliage ends of said plugs to spread apart one from another to assume a singulated condition for subsequent handling; and synchronous drive means for operating said tray indexing means, said feeder means, said reciprocation means, and said transporting means in precise timed relationship over machine cycle during which said reciprocation means causes ejection of a row of plugs and subsequent retraction of said plug ejection means, said feeder means receives said row of plugs, said tray indexing means causes the next row of plugs to be moved into operative alignment with said plug ejection means, and said feeder means transports said row of plugs toward said pick up location in a singulated disposition at said path portion of substantial curvature.

2. The invention of claim 1 wherein said plug ejection means comprises a carriage having a plurality of coplanar pins mounted thereon, said pins being parallel and at a spacing corresponding to the spacing of plugs in a row in said tray.

3. The invention of claim 1 wherein said reciprocation means comprises:

spring biasing means for urging said plug ejection means toward said engaged position; and cooperating cam and cam follower means configured so that cyclical movement of said cam means causes cyclical retraction of said plug ejection means, cyclical movement of said cam being provided by said synchronous drive means.

4. The invention of claim 3 wherein said cam is configured to provide substantially zero dwell of said plug ejection means at said engaged position to prevent fouling of the respective butt ends of said plugs by said plug ejection means.

5. The invention of claim 1 wherein said tray indexing means comprises:

a tray transport conveyor;

tray engaging lugs on said conveyor for positively moving said tray in response to movement of said tray transport conveyor;

ratchet means coupled to said tray transport conveyor for producing corresponding movement of said tray transport conveyor upon movement of said ratchet means;

pawl means engageable with said ratchet means to produce incremental movement of said ratchet means upon reciprocation of said pawl means; and pawl driving means operatively connected to said synchronous drive means to cause reciprocation of said pawl means and consequential intermittent movement of said ratchet means and tray transport conveyor.

6. The invention of claim 1 wherein said feeder means comprises:

a feeder conveyor and a plurality of plug receiving receptacles mounted thereto at a spacing corresponding to the spacing of said plugs in a row in said tray;

said driving means being operable to drive said feeder conveyor uniformly with respect to said input drive so that said feeder conveyor may be driven at a generally uniform speed over the entirety of a cycle.

7. The invention of claim 6 wherein each of said plug receiving receptacles comprises an open ended trough, and further comprising:

a crowder wheel having an outer peripheral portion located proximate said feeder conveyor to have an open end of each trough pass in proximity thereto, causing said crowder wheel to longitudinally align plugs in said troughs.

8. The invention of claim 1 wherein said plugs have a tapered configuration defined by correspondingly tapered cavities in said tray so that upon ejection from said tray, a given plug becomes progressively less tightly held by its respective cavity, wherein said tray is disposed vertically in said apparatus so that said plugs have their axes generally horizontal, and further comprising:

means interposed in the path of a row of plugs being ejected by said ejection means for causing upward angulation of said plugs as they are ejected to counteract downward angulation due to said tapered configuration, said upward angulation maintaining the respective foliage ends of said plugs above said feeder means to avoid fouling thereof during ejection.

9. The invention of claim 8 wherein said means for causing upward angulation comprises means defining a shelf extending horizontally away from said tray by a fixed increment, and horizontally in a direction parallel to the plane of said tray along the entire length of said row of plugs, said shelf surface being at an elevation above the lowest point of said cavities of said row when said tray is in said position of operative alignment.

10. Apparatus for transferring soil plugs, each plug having a foliage end and a butt end, from a densely packed configuration of plural rows of cavities in a growing tray to a singulated condition available for subsequent handling, comprising:

a reciprocable carriage having a plurality of coplanar parallel pins mounted thereon at a spacing corresponding to the spacing of plugs in a row in said tray;

biasing means urging said carriage with respect to an engaged position with said pins extending through said cavities in said tray;

means for periodically urging said carriage away from said biasing means to withdraw said pins from said tray;

a feeder conveyor disposed in a horizontal plane and having a portion running parallel to a front surface of said tray;

a plurality of plug receiving receptacles mounted to said conveyor at a spacing corresponding to spacing of plugs in a row in said tray;

a tray transport conveyor disposed in a vertical plane;

tray engaging means on said tray transport conveyor for supporting and positively driving said tray in response to movement of said tray transport conveyor to produce incremental movement of said tray upon reciprocation of said carriage; and means driving said feeder conveyor over a path of substantial curvature for singulating said plugs to pick up means.

11. The invention of claim 10 wherein each of said plug receiving receptacles comprises an open ended trough, and further comprising:

a crowder wheel sprocket engaged by said feeder conveyor at a point upstream of said take up location and downstream of said path of high curvature; and a crowder wheel mounted coaxially to said crowder wheel sprocket, having an outer peripheral portion located proximate said feeder conveyor such that an open end of each trough passes in proximity to said outer peripheral portion whereupon the butt ends of plugs in said passing troughs are longitudinally aligned within said troughs upon passage by said crowder wheel.

12. The invention of claim 10 wherein said ejecting means includes an activating cam, and said cam is configured, relative to a cam follower, to provide substantially zero dwell of said carriage at said position of maximum engagement to prevent fouling of the respective butt ends of plugs undergoing ejection by said pins.

13. Apparatus for the injection of plugs from horizontal disposition in a tray to a horizontal disposition in a passing conveyor, said plugs have a tapered configuration defined by correspondingly tapered cavities in said tray so that upon ejection from said tray, a given plug becomes progressively less tightly held by its respective cavity so that the foliage end of a plug being ejected has a tendency to angulate downwardly, said apparatus comprising:

means for ejecting plugs from said trays including an ejection for urging said plugs from said trays;

a lip extending horizontally along a front surface of said tray in the direction of a row of plugs being ejected, said lip including an upper portion that is at an elevation above the lowermost point of the row of cavities so as to slightly intrude into the path of the corresponding plugs being ejected and deflect said plugs upwardly to counteract said tendency to angulate downwardly.

14. The invention of claim 13 wherein said means for ejecting includes a cam, said cam being configured to provide movement of said ejecting means such that said ejecting means extends beyond said lip, and to provide abrupt reversal of said ejecting means at said engaged position to avoid flipping said plugs prior to said engaged position and to avoid fouling of said plugs immediately after said engaged position.

15. Apparatus for transferring a soil plug having a foliage end and a butt end from a tapered cavity in a growing tray to a relatively moving receiving station for subsequent handling, said plug having a tapered configuration defined by said tapered cavity in said tray so that upon ejection from said tray, said plug becomes progressively less tightly held by said cavity, comprising:

plug ejection means operable upon reciprocation thereof to assume an end engaged position to eject said plug from said tray;

reciprocation means operable to reciprocate said plug ejection means to effect ejection of said plug;

means for maintaining said tray in a vertical disposition with said cavity in alignment with said plug ejection means so that said plug has its axis generally horizontal;

drive means for operating said reciprocation means to cause ejection of said plug; and means interposed in the path of said plug being ejected by said ejection means for causing upward angulation of said plug as it is ejected to counteract downward angulation due to said tapered configuration, said upward angulation maintaining the foliage end of said plug above said moving receiving station to avoid fouling thereof during ejection.

16. The invention of claim 15 wherein said means for causing upward angulation comprises means defining a shelf extending horizontally away from said tray by a fixed increment, and horizontally in a direction parallel to the plane of said tray, said shelf having an upper surface at an elevation above the lowest point of said cavity when said cavity is in said position of operative alignment.

* * * * *